(12) United States Patent
Shu et al.

(10) Patent No.: US 8,954,917 B1
(45) Date of Patent: Feb. 10, 2015

(54) METHOD AND SYSTEM FOR PERFORMING FAST ELECTRICAL ANALYSIS AND SIMULATION OF AN ELECTRONIC DESIGN FOR POWER GATES

(71) Applicant: Cadence Design Systems, Inc., San Jose, CA (US)

(72) Inventors: John Yanjiang Shu, Pleasanton, CA (US); Wei Michael Tian, San Jose, CA (US); An-Chang Deng, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/050,269

(22) Filed: Oct. 9, 2013

Related U.S. Application Data

(63) Continuation-in-part of application No. 13/334,008, filed on Dec. 21, 2011, now Pat. No. 8,595,677.

(51) Int. Cl.
  *G06F 17/50* (2006.01)
(52) U.S. Cl.
  CPC .................................. *G06F 17/5009* (2013.01)
  USPC ........... 716/136; 716/100; 716/103; 716/110; 716/111; 716/132; 716/133
(58) Field of Classification Search
  CPC ............ G06F 17/5045; G06F 17/5068; G06F 17/5081; G06F 2217/78
  USPC .......... 716/100, 103, 110–111, 132–133, 136
  See application file for complete search history.

(56) References Cited

U.S. PATENT DOCUMENTS

| | | | |
|---|---|---|---|
| 5,827,952 A | 10/1998 | Mansure et al. | |
| 5,872,952 A * | 2/1999 | Tuan et al. | 714/724 |
| 5,878,053 A * | 3/1999 | Koh et al. | 714/724 |
| 6,311,147 B1 * | 10/2001 | Tuan et al. | 703/18 |
| 6,577,992 B1 * | 6/2003 | Tcherniaev et al. | 703/14 |
| 6,675,363 B1 * | 1/2004 | Oleksinski | 716/112 |
| 7,016,794 B2 * | 3/2006 | Schultz | 702/64 |
| 7,283,943 B1 * | 10/2007 | Qi et al. | 703/14 |
| 7,693,700 B1 * | 4/2010 | Vanderhoek et al. | 703/14 |
| 7,928,761 B2 * | 4/2011 | Voogel et al. | 326/38 |
| 7,987,439 B2 * | 7/2011 | Che et al. | 716/103 |
| 7,987,761 B2 | 8/2011 | Butler et al. | |

(Continued)

OTHER PUBLICATIONS

Non-Final Office Action dated Mar. 7, 2013, for U.S. Appl. No. 13/334,008.

*Primary Examiner* — Stacy Whitmore
(74) *Attorney, Agent, or Firm* — Vista IP Law Group, LLP

(57) ABSTRACT

A system, method, and computer program product is disclosed for performing electrical analysis of a circuit design. A voltage-based approach is described for performing two-stage transient EM-IR drop analysis of an electronic design. A two-stage approach is performed in some embodiments, in which the first stage operates by calculating the voltage at certain interface nodes. In the second stage, simulation is performed to simulate the circuit to concurrently obtain the current at the interface nodes. In some embodiments, multiple adjacent devices as identified as interface devices for purposes of the analysis. One situation where it may be useful to analyze a larger portion of the circuitry in this way where the analysis is being performed on a netlist having a power gate.

20 Claims, 10 Drawing Sheets

(56) References Cited

U.S. PATENT DOCUMENTS

| | | | |
|---|---|---|---|
| 8,042,080 B2* | 10/2011 | Hirano | 716/112 |
| 8,286,110 B1* | 10/2012 | Kukal et al. | 716/109 |
| 8,595,677 B1* | 11/2013 | Shu et al. | 716/136 |
| 2004/0054979 A1* | 3/2004 | Bobba et al. | 716/13 |
| 2008/0209366 A1* | 8/2008 | Che et al. | 716/4 |
| 2009/0187868 A1* | 7/2009 | Jain et al. | 716/6 |
| 2009/0293024 A1* | 11/2009 | Brink et al. | 716/4 |
| 2012/0005639 A1* | 1/2012 | Fish et al. | 716/104 |
| 2012/0215516 A1* | 8/2012 | Lau et al. | 703/16 |

\* cited by examiner

US 8,954,917 B1

METHOD AND SYSTEM FOR PERFORMING FAST ELECTRICAL ANALYSIS AND SIMULATION OF AN ELECTRONIC DESIGN FOR POWER GATES

CROSS-REFERENCE TO RELATED APPLICATIONS

The present application is a continuation-in-part of U.S. Ser. No. 13/334,008, now U.S. Pat. No. 8,595,677 filed on Dec. 21, 2011, which is hereby incorporated by reference in its entirety.

FIELD

The invention relates to the field of electrical design and verification.

BACKGROUND

The invention relates to technology for designing and verifying an electronic design, such as the design of an integrated circuit ("IC").

Modern electronic design is typically performed with computer aided design (CAD) tools or electronic design automation (EDA) systems. To design an integrated circuit, a designer first creates high level behavior descriptions of the IC device using a high-level hardware design language (HDL). Common examples of HDLs include Verilog and VHDL. An EDA system typically receives the high level behavioral descriptions of the IC device and translates this high-level design language into netlists of various levels of abstraction. Essentially, the process to implement an electronic device begins with functional design and verification (e.g., using RTL), and then proceeds to physical design and verification.

Circuit designers and verification engineers use different methods to verify circuit designs. One common method of verification is the use of simulation. Simulation dynamically verifies a design by monitoring behaviors of the design with respect to test stimuli. For many types of designs, simulation can and should be performed during the design process to ensure that the ultimate goals are achievable and will be realized by the finished product. The exploding demand for high performance electronic products has increased interest in efficient and accurate simulation techniques for integrated circuits. For analog designs, an analog-based simulation approach such as SPICE is commonly used to implement simulation of the design. For digital circuit, equivalent digital simulation is performed.

There are many types of electrical analyses that need to be performed to ensure the proper operation of an electronic design. For example, it is often desirable to analyze power distribution networks to check for potential problems relating to IR drops and electromigration effects. Power distribution networks are used to distribute power and ground voltages from pad/package locations to circuit blocks in a design. Shrinking device dimensions, faster switching frequencies and increasing power consumption in deep submicron technologies can cause large switching currents to flow in the power and ground networks, which degrade performance and reliability.

Due to the resistance of interconnects in the power networks, there is a voltage drop across the network, commonly referred to as IR drop. IR drop is a reduction in voltage that occurs on power supply networks (i.e., VDD) in integrated circuits. IC designs usually assume the availability of an ideal power supply that can instantly deliver any amount of current to maintain the specified voltage throughout the chip. In reality, however, a combination of increasing current per-unit area on the die and narrower metal line widths (which causes an increase in the power-grid resistance) causes localized voltage drops within the power grid, leading to decreased power supply voltage at cells and transistors. These localized drops in the power supply voltage decrease the local operating voltage of the chip, potentially causing timing problems and functional failures. IR drop can be both a local and global phenomena. IR drop can be local phenomenon when a number of cells in close proximity switch simultaneously, causing IR drop in that localized area. A higher power grid resistance to a specific portion of the chip can also cause localized IR drop. IR drop can be a global phenomenon when activity in one region of a chip causes effects in other regions. For example, one logic block may suffer from IR drop because of the current drawn by another nearby logic block.

Electromigration (EM) is an effect on a circuit caused by movement of ions in a conductor structure, which over time will reduce the effective ability and reliability of the conductor to conduct current from one part of the circuit to another. Electromigration could significantly decrease the reliability of an IC, resulting in possible errors and failures in the IC product. With modern reductions in feature sizes made possible by improving manufacturing processes, the probability of failure due to electromigration becomes much more possible due to increases of both the power density and the current density of wiring and power structures.

Therefore, it is important for an EDA verification tool to properly and adequately be able to perform electrical analysis to check for potential IR drop and EM problems.

One approach that can be taken to perform IR drop and EM analysis is a two-stage analysis that involves: (a) first performing simulation to obtain a current through each device path on a power network of interest; and (b) using the current obtained in the first stage to analyze for IR drop and EM problems. However, this approach is problematic for multiple reasons. One problem with this approach is that it assumes a constant VDD voltage is being applied to each device path, which may be a faulty assumption under certain situations and hence may lead to inaccurate results. This may occur, for example, if RC effects cause the applied voltage at a circuit path to differ from VDD, which may result in possibly erroneous analysis results if not taken into account. Another problem with this approach is that the action of solving for probed current values in the first stage requires the currents to be part of solution variables for different partitions of a global circuit analysis by a (Fast-Spice) simulator, which are involved in iterations of the global analysis. This causes extra evaluations of device models which are expensive in terms of CPU time given the large size of modern circuit designs. Thirdly, computed active device currents usually switch very fast, therefore storing the full waveforms of large number of device currents as is required in this approach will require large amount of storage space. Finally, solving in the second stage with high accuracy of a linear RC circuit stimulated by fast switching currents dictates the adoption of very small timesteps. Overly small timesteps will slow down the computation process.

Therefore, there is a need for an improved approach to perform electrical analysis, e.g., to analyze power distribution networks for IR drop and EM problems.

SUMMARY

Some embodiments of the invention are directed to an improved approach for performing electrical analysis of a circuit design. A voltage-based approach is described for performing two-stage transient EM-IR drop analysis of an electronic design. A two-stage approach is performed in some embodiments, in which the first stage operates by calculating the voltage at certain "interface" or "tap" nodes, which are nodes for devices that are directly adjacent to the net of interest. A new netlist is created that includes the tap devices. In the second stage, simulation is performed to simulate the circuit. In some embodiments, particularly when power nets are being analyzed, the inventive approach concurrently obtains the current at the tap nodes. These currents are then used to perform simulation, e.g., to facilitate EM and IR drop analysis for a power net.

In some embodiments, multiple adjacent devices as identified as interface devices for purposes of the analysis. Therefore, the invention is not limited to selecting only the single directly adjacent device as the interface devices, and indeed other embodiments may select multiple ones of the devices along the circuit path as the interface devices (e.g., by selecting the first two connected devices to the net as the interface devices). One situation where it may be useful to analyze a larger portion of the circuitry in this way where the analysis is being performed on a netlist having a power gate.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood, some embodiments of the invention will now be described, by way of example only, with reference to the accompanying drawings.

DETAILED DESCRIPTION

Figure 1:
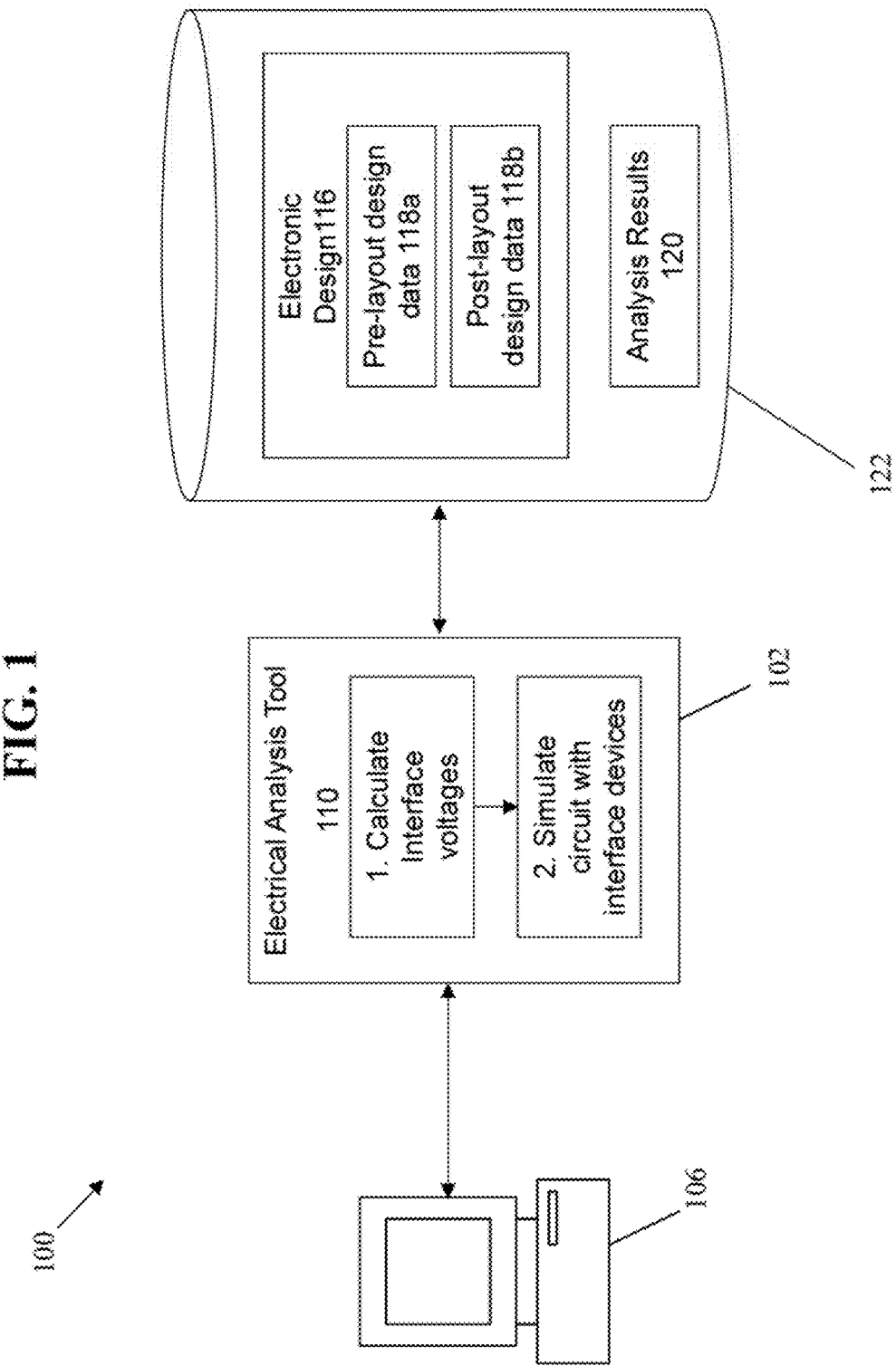
FIG. 1 illustrates a system for performing electrical analysis on a circuit design according to some embodiments of the invention.

Some embodiments of the invention are directed to an improved approach for performing analysis on an electrical circuit design. In some embodiments, a voltage-based approach is described for performing two-stage transient EM-IR drop analysis of an electronic design.

To better explain the benefits of the present embodiments of the invention, consider again the problems with the alternative approach for performing IR drop and EM analysis, which involves (a) first performing simulation to obtain a current through each device path on a power network of interest, and then (b) using the current obtained in the first stage to analyze for IR drop and EM problems. As explained above, one problem with this approach is that it assumes that a constant VDD voltage is being applied to each device path, which may be a faulty assumption, for example, if RC effects cause the applied voltage at a device path to differ from VDD. Another problem with this approach is that solving for probed current values requires the currents to be part of solution variables for different partitions of a global circuit analysis by a simulator, such as a Fast-Spice simulator. This involves multiple iterations of the global analysis, which causes extra evaluations of device models that are computationally expensive, e.g., in terms of both time and CPU usage given the large size of modern circuit designs. Additionally, computed active device currents usually switch very fast, thereby requiring storage of full waveforms of a large number of device currents that will further require large storage spaces. Finally, solving the second stage with high accuracy for a linear RC circuit stimulated by fast switching currents dictates the adoption of very small timesteps, and overly small timesteps will slow down the computation process.

Embodiments of the present invention provide a much better approach for performing analysis on a circuit design which overcomes these problems of the alternate approach. According to some embodiments, a two-stage analysis scheme is provided which operates by first calculating voltages in the first stage. The voltage values are calculated at selected nodes within the circuit design, e.g., specifically with respect to "interface nodes" (also referred to herein as "tap nodes") that correspond to circuit devices that are directly adjacent and connected to the net being analyzed. A new netlist is determined that includes the interface devices, such as the devices that are directly adjacent to the net being analyzed. In the second stage, simulation is performed on the new netlist to perform the electrical analysis. In one specific embodiment, current values are concurrently determined for the interface nodes, in which the simulation is performed using the voltage values obtained in the first stage as applied to the interface device itself. The simulation results are used to perform IR drop and EM analysis on the circuit components of the net.

This approach provides analysis results that are much more accurate as compared to the alternative approach of first computing current values. This is because the present embodiment performs simulation with consideration of actual devices (e.g., the interface devices) that extend from the net, rather than just considering current values without regard to the actual devices that extend from the net. In addition, the simulations are performed using voltages that take RC effects into account on the power net, rather than merely assuming constant VDD voltages along the power net. Because of these levels of design details that are considered during analysis, this means that the current invention is capable of providing very realistic and accurate analysis results.

Moreover, the present approach also provides a very efficient and cost-effective way to perform the analysis. This is because the approach of first computing the voltage values can be performed very efficiently, particularly as compared to the approach of first computing current values. This result is achieved because voltage variation range and rate of change is much less than for the current analysis.

FIG. 1 illustrates an example system 100 which may be employed in some embodiments of the invention to analyze an electronic design 116. System 100 may include one or more users at one or more user station(s) 106 that operate the system 100 to design or verify the electronic design 116. Such users include, for example, design engineers or verification engineers. User station 106 comprises any type of computing station that may be used to operate, interface with, or implement EDA applications or devices, such as electrical analysis tool 110. Examples of such user stations 106 include for example, workstations, personal computers, or remote computing terminals. User station 106 comprises a display device, such as a display monitor, for displaying electronic design analysis results 120 to users at the user station 106. User station 106 also comprises one or more input devices for the user to provide operational control over the activities of system 100, such as a mouse or keyboard to manipulate a pointing object in a graphical user interface.

The electronic design 116 may be stored in a computer readable storage device 122. The electronic design 116 corresponds to any form of electrical design data that needs to be analyzed by the electrical analysis tool 110. For example, electronic design 116 may include pre-layout data 118*a* in the form of higher level specifications, netlists, or schematics. In addition, electronic design 116 may also include post-layout data 118*b* in the form of layout data comprising physical design or mask information.

Computer readable storage device 122 includes any combination of hardware and/or software that allows for ready access to the data that is located at the computer readable storage device 122. For example, computer readable storage device 122 could be implemented as computer memory operatively managed by an operating system. The computer readable storage device 122 could also be implemented as an electronic database system having storage on persistent and/or non-persistent storage.

One or more EDA tools, such as electrical analysis tool 110, may be used by users at a user station 106 to analyze the electronic design 116 and to generate analysis results 120.

In the present embodiment, the electrical analysis tool generally operates using a two-stage approach, where voltages are calculated for selected interface nodes within the circuit design in stage 1. In some embodiments, the first stage is performed by simulating the circuit with a simplified model of the physical behavior of resistive, capacitive and/or inductive effect in each selected net.

In stage 2, simulation is performed upon a circuit netlist that is modified to include the power net and the circuit devices that correspond to the interface nodes. The simulation is performed using the voltage values obtained in stage 1. For a selected power distribution net, tap currents are concurrently calculated by using tap node voltages from previous timesteps and interface node voltage source voltages. Further, the second stage is performed by simulating the net using the concurrently computed tap currents together with the detailed parasitic resistor, capacitor and/or inductor network model of the net. The voltage of each node and/or current of each element of the parasitic network model is calculated to report the EM/IR drop effect.

Figure 2:
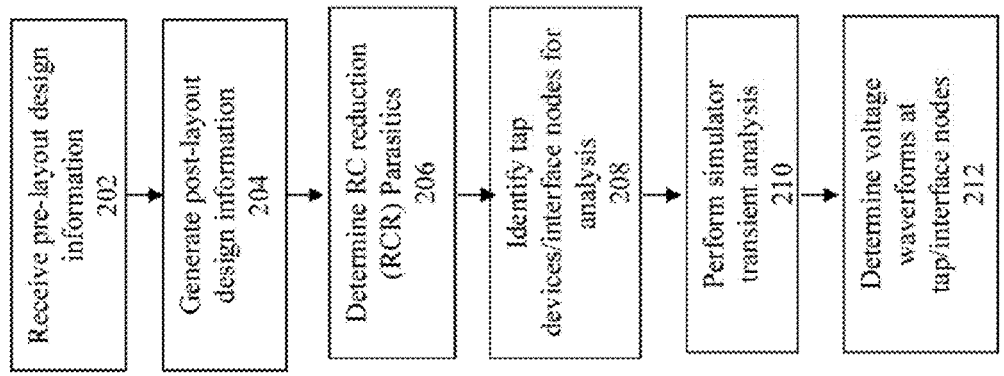
FIG. 2 shows a flowchart of an approach for performing a first stage analysis according to some embodiments of the invention.
Figure 3:
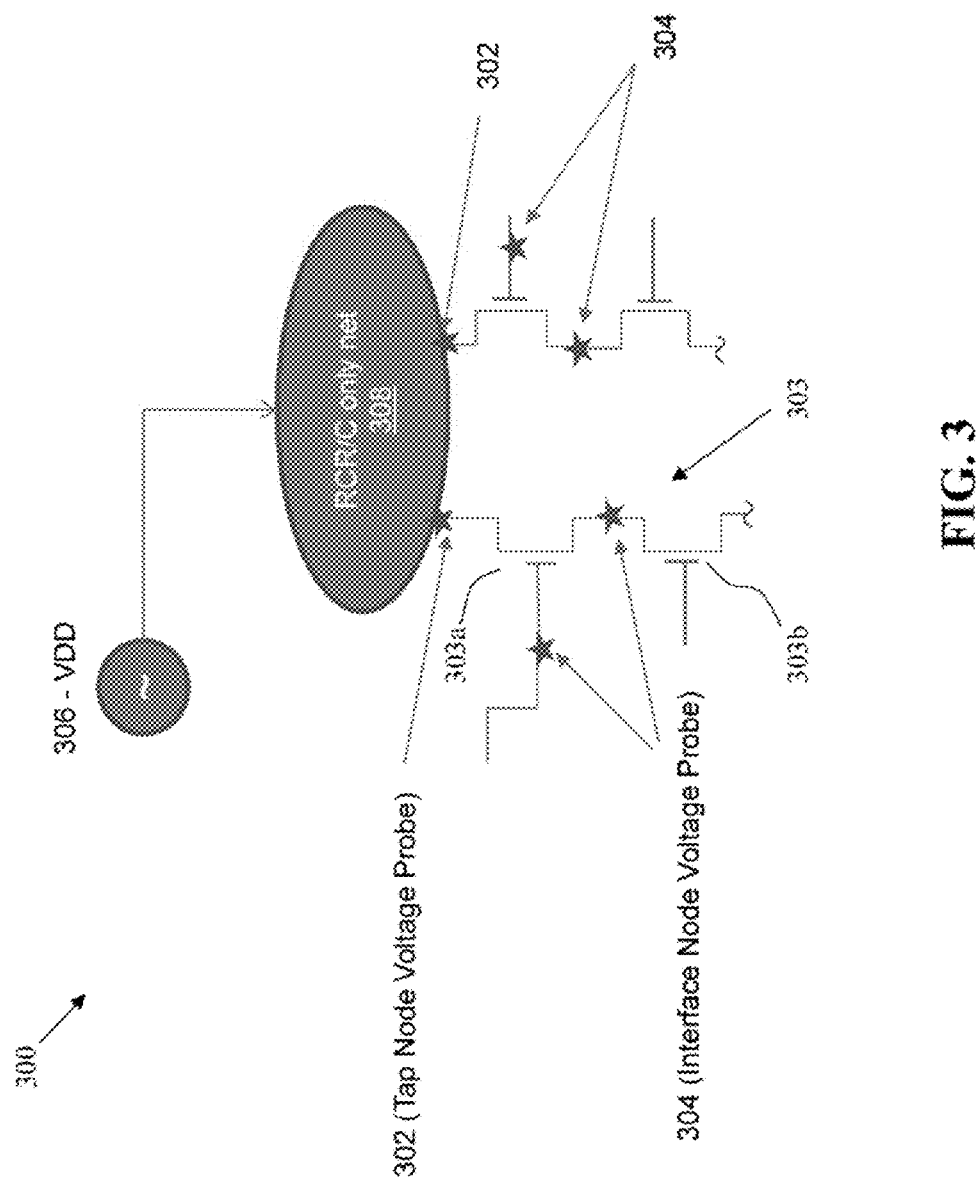
FIG. 3 illustrates a circuit design for which a first stage analysis is to be performed.

FIG. 2 shows a flowchart of an approach to implement the first stage, which is illustrated with reference to the circuit 300 shown in FIG. 3. At 202, the pre-layout design data is received. This design data generally comprises a netlist that includes the circuit components and nets within the circuit design. Next, at 204, placement and routing are performed to generate post-layout design data. Any suitable placement/routing tool may be utilized to perform this action. The result of this action is a layout of the electronic circuit design.

At 206, RC reduction is performed upon the circuit design. In some embodiments, a C-only reduction may be performed in this step. This action is performed to exclude parasitic RC for the nets to be analyzed. This forms a RCR/C only net 308 for the next steps in the analysis process, e.g., as shown in FIG. 3.

Next, at 208, "interface devices" are extracted from the circuit netlist to identify the tap devices and interface nodes for the analysis. To explain, consider the circuit diagram 300 shown in FIG. 3. The circuit diagram 300 includes a RCR/C only net 308 to which voltage is supplied by VDD 306.

A circuit path 303 that extends from the net 308 may include any number of electrical devices, such as transistors 303*a* and 303*b*. The present embodiment limits the analysis to be directed to only a subset of the devices that are within path 303. This subset of devices is identified to become the "interface device" that is extracted to form the netlist. For example, in some embodiments, the invention will designate only the immediately neighboring device 303*a* that is adjacent to net 308 as an "interface device" (also referred to herein as the "tap device"). In this approach, any devices that are not directly adjacent to the net 308, such as transistor 303*b*, will not be designated as an interface device.

At 210 of FIG. 2, simulator transient analysis is performed upon the circuit design. The simulator transient analysis is performed to obtain a tap voltage values, e.g., at tap node 302, based upon, using, and also obtaining voltage values at the interface node voltage probes 304. This simulation provides, at 212, a voltage waveform at the tap/interface node 302 and the interface nodes 304. This process is repeated to obtain a waveform at tap node 302 for each of the interface devices, e.g., for all transistor devices 303*a* that are immediately adjacent to net 308.

It is noted that while the present embodiment only identifies the directly adjacent transistor as an interface device, other embodiments may utilize additional devices as interface devices for purposes of the analysis. Therefore, the invention is not limited to selecting only the single directly adjacent device as the interface devices, and indeed other embodiments may select multiple ones of the devices along the circuit path as the interface devices (e.g., by selecting the first two connected devices to the net 308 as the interface devices).

Figure 4:
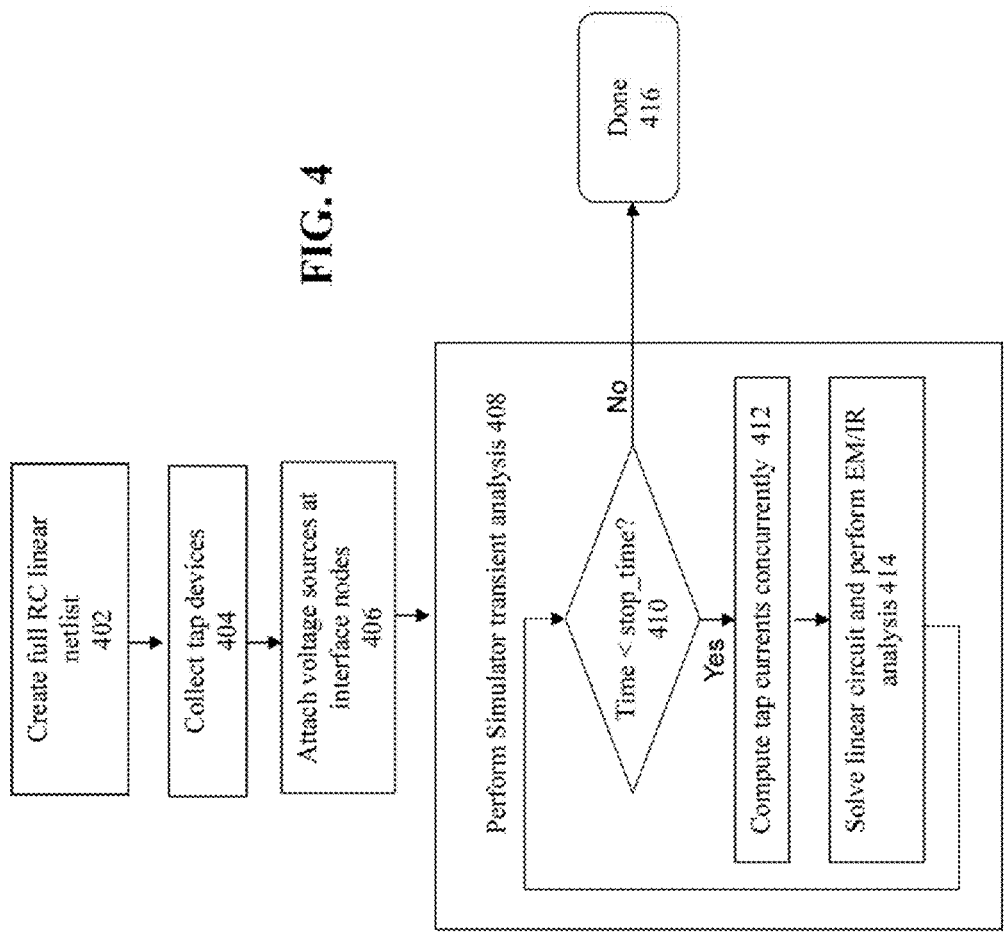
FIG. 4 shows a flowchart of an approach for performing a second stage analysis according to some embodiments of the invention.
Figure 5:
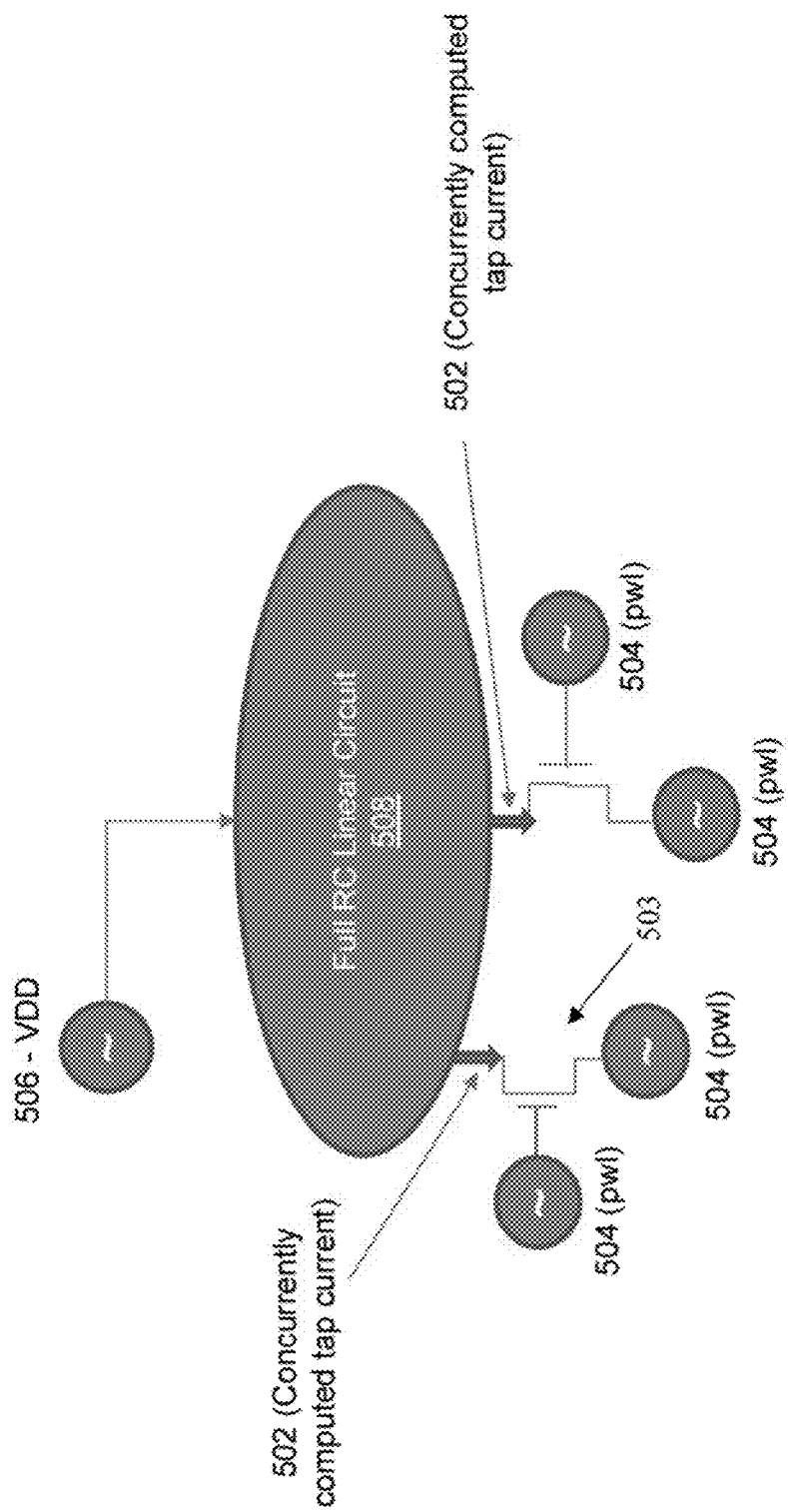
FIG. 5 illustrates a power net for which a second stage analysis is to be performed.

FIG. 4 shows a flowchart of an approach to implement the second stage of the analysis, which is illustrated with reference to the circuit shown in FIG. 5. At 402, a full RC linear circuit netlist is created, e.g., which is shown as full RC circuit 508 in FIG. 5. This includes the relevant RC details of the net that is being analyzed.

At 404, the interface/tap devices are collected. This action identifies the interface/tap devices for which voltage waveforms were generated in the first stage, e.g., the devices 503 that are directly adjacent to the net 508. In other words, the interface devices for which voltage waveforms had previously been generated are combined with the parasitic RC net to form a new netlist for the full RC linear circuit.

At 406, the calculated voltage sources are attached to the interface nodes 504 for these tap devices 503. Thereafter, at 408, simulator transient analysis is performed, e.g., to generate data for EM or IR drop analysis. Any suitable approach can be utilized to perform the simulation. For example, a brute force approach can be taken to simulate the new netlist to obtain the necessary circuit values. Alternatively, the simulation problem can be partitioned/broken down so that the simulator transient analysis is performed for each tap device.

One possible approach for some embodiments is described in FIG. 4, which involves concurrently computing tap currents to perform the simulation analysis. During the simulation process 408, a determination is made at 410 whether the simulation time has reached a designated stop time, e.g., by checking whether an elapsed simulation time is less than a specified stop time. If the specified amount of simulation time is not yet reached, then the process proceeds to 412 to compute tap current values. This is accomplished by applying the voltage waveform(s) established in the first stage to the respective tap devices in the simulation to concurrently obtain the tap current values. As shown in FIG. 5, a tap current 502 is concurrently computed for each tap interface device, e.g., based at least in part upon applying the previously computed voltage waveforms to the interface nodes 504 (pwl or piecewise linear approach) that had been established for each tap device. If a power net is being analyzed, then the (ideal) input voltage VDD is also considered to generate the concurrent tap current values during the simulation. It is noted that the invention may be applied other types of nets as well. For example, some embodiments of the invention may be applied to signal nets. In this case, the second stage may not involve similar application of the VDD values for the simulation of the new netlist.

Any suitable simulator or simulation approach may be utilized to perform this simulation to concurrently compute the tap currents. For example, either SPICE or FASTSPICE may be utilized to perform simulation in this step to concurrently obtain the tap current. Another possible solution is to generate a table model of the currents and voltage for the tap interface devices. This table model is created in advance based upon known circuit behaviors for components in the circuit design. At run-time, a table look-up is performed on the tables in the model to obtain the concurrent tap current values. This approach therefore allows for very efficient processing at run-time. At 414, the linear circuit is solved to perform EM and IR drop analysis.

The process then returns back to 410 to check whether elapsed simulation time has reached the designated stop time. If so, then the process ends at 416. This simulation process is performed for each of the tap nodes and tap devices in the circuit design.

Therefore, what has been described is an improved approach for performing analysis of an electronic design. The two-stage approach of the present embodiment provides analysis results that are much more accurate as compared to the alternative approach of first computing current values, since simulation is performed with consideration of actual devices that extend from the power net, rather than considering just current values without regard to the actual devices that extend from the power net. In addition, the simulations are performed using voltages that take RC effects into account on the power net, which provides a great improvement over approaches that merely assume constant VDD voltage values. This level of design detail being considered during analysis allows for very realistic and accurate analysis results.

Moreover, the present approach also provides a very efficient and cost-effective way to perform the analysis, since the first stage aspect of first computing the voltage values can be performed very efficiently, particularly as compared to the approach of first computing current values. This approach can be used for any type of analysis of any portion of the circuit design. While the above embodiment was described with respect to analysis of a power net, it is noted that other portions of a circuit design may also be analyzed using the above—described approach. In addition, while the approach is particularly useful to perform EM and IR drop analysis, it is also applicable to other types of electrical analysis as well.

Power Gate Analysis

The present invention is not limited to the situation where only the directly adjacent transistor is identified as the interface device. In fact, as explicitly stated above, other embodiments may utilize additional devices as interface devices for purposes of the analysis. Therefore, the invention is not limited to selecting only the single directly adjacent device as the interface devices, and indeed other embodiments may select multiple ones of the devices along the circuit path as the interface devices (e.g., by selecting the first two connected devices to the net 308 as the interface devices).

One situation where it may be useful to analyze a larger portion of the circuitry in this way is where the analysis is being performed on a netlist having one or more power gates. Power gating is a very common method to turn on/off portions of an IC chip, e.g., to reduce power consumption. For example, electronic products that are very sensitive to excessive power consumption issues (such as mobile telephones) utilize power gates to control the power supply to portions of the product (such as cameras on the mobile telephone) to reduce excessive power consumption by IC chips in the camera.

Figure 6:
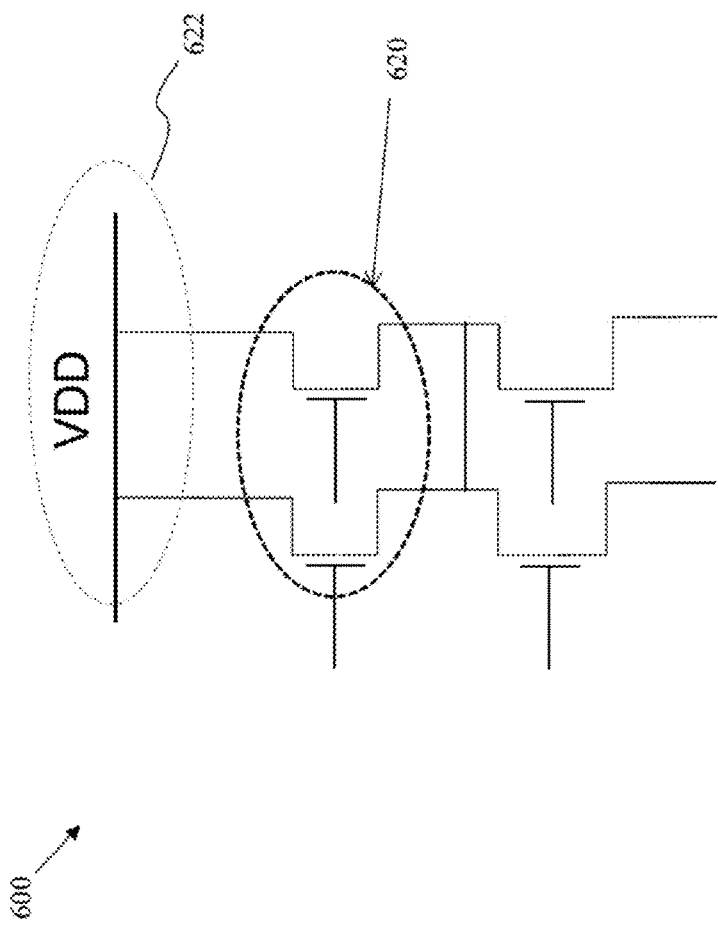
FIG. 6 shows an example circuit having a power gate.

To explain, consider the circuitry 600 shown in FIG. 6. This circuitry 600 shows a global power net 622 that is connected to power gates 620. In this circuit, the MOSFET transistors 620 are used to connect the global power net 622 to the rest of the netlist (e.g., embodied as a virtual power net).

During the design and verification phases of the electronic design process, it may be necessary to analyze this type of circuitry to make sure that it will function for its intended use. Therefore, it may be necessary to perform analysis, such as (a) computing time to power up ($T_{on}$) when switching the net from an off-state; (b) reporting accurate IR drops for both the global and virtual power nets, as well as voltage drop across the power gates; and/or (c) performing EM analysis for both the global and virtual power nets.

Figure 7:
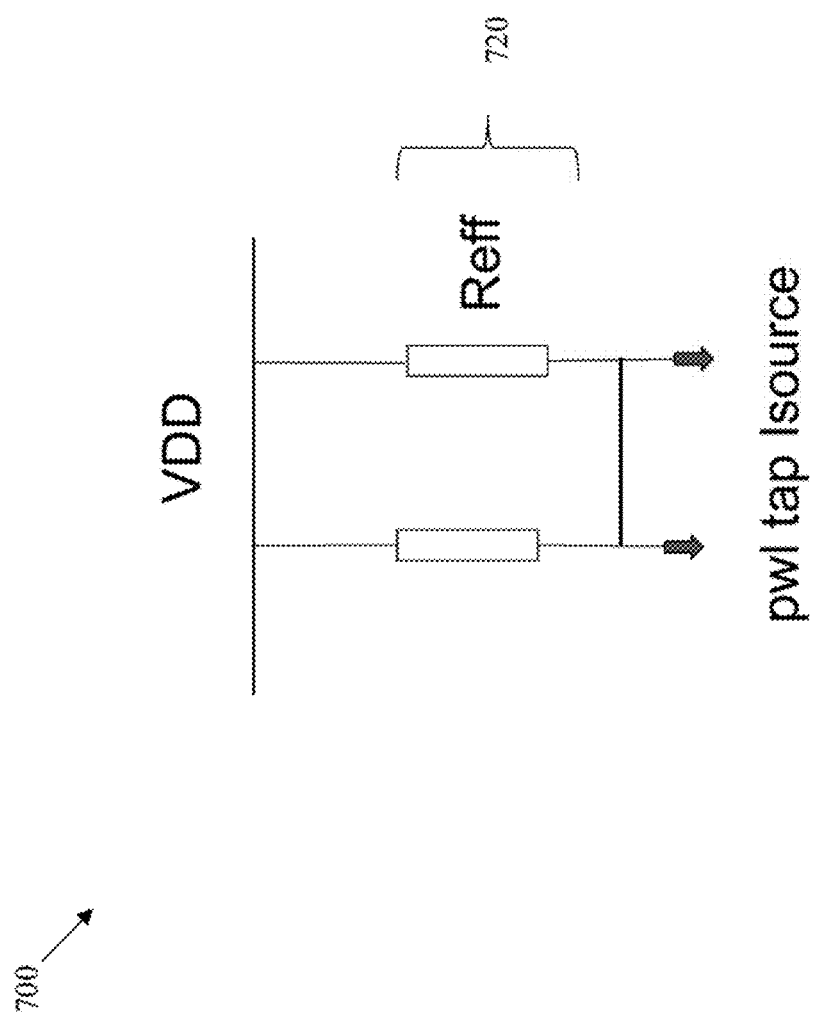
FIG. 7 shows an approach to analyze the circuit of FIG. 6.

Conventional analysis tools do not have a satisfactory solution to perform these tasks. FIG. 7 shows one possible approach that can be taken to handle the analysis. In this approach, the power gates are replaced by estimated resistance values 720 ($R_{eff}$). $R_{eff}$ is approximated (e.g., using (Vdd-Vddp)/Ids) from C-only first stage simulation and is time varying. However, this approach may suffer from accuracy issues, since it is premised upon approximate values for $R_{eff}$. Moreover, this approach makes assumptions that are focused for the on/off state, but may not be particularly accurate with respect to the analysis or the ramp-up/power-up situation.

Embodiments of the present invention provide an improved approach to perform analysis upon circuitry having power gates. The invention is applied to pull in two levels of the circuit for the analysis. The first level and second level devices are then solved together. In this way, the analysis/modeling provides a solution that is both highly accurate and very fast/efficient.

Figure 8:
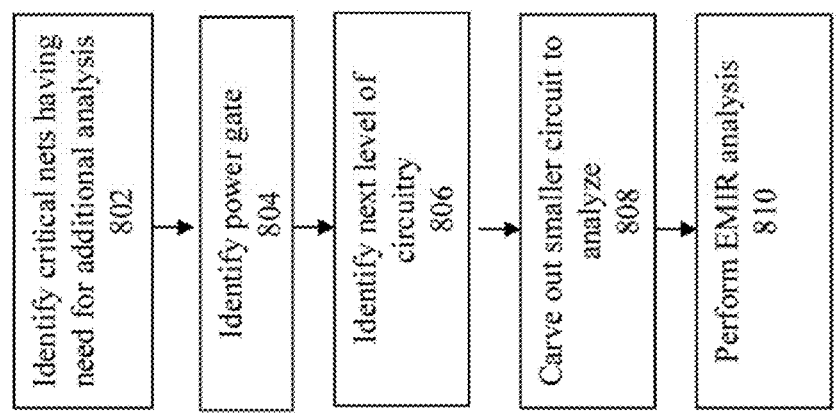
FIG. 8 shows a flowchart of an approach to implement some embodiments of the invention.

FIG. 8 shows a flowchart of an approach to implement some embodiments of the invention. At 802, identification is made of critical nets which have the need for the current analysis, e.g., identification of nets that have power gates. In some embodiments, the electronic designer/engineer makes this identification of the critical nets. In an alternate embodiment, the EDA tool uses a rules-based approach to automatically identify critical nets for the analysis, e.g., based upon the criteria of identifying a power gate in a given net. One reason to obtain inputs for identification of the critical nets is to limit the number of nets that need to be co-solved to perform the analysis.

At 804, the power gates are identified in the critical net. Any suitable approach can be taken to identify the power gates. For example, one possible approach is to identify a MOSFET transistor that has its source terminal connected to the global power net and its drain terminal connected to a virtual power net.

At 806, the process identifies the next level of all MOSFETs/devices in the nets. At 808, a smaller portion of the overall circuitry is carved out. As noted above, two levels of the net are analysis in the current embodiment, as opposed to alternative embodiments that only analyze a single level.

Thereafter, at 810, simulations/EMIR analyses are performed. To perform the analysis, IR drops relative to VDD is computed for both nets. In addition, IR drops across the power gates are also computed. In addition, EM analysis is also performed for both nets.

Figure 9:
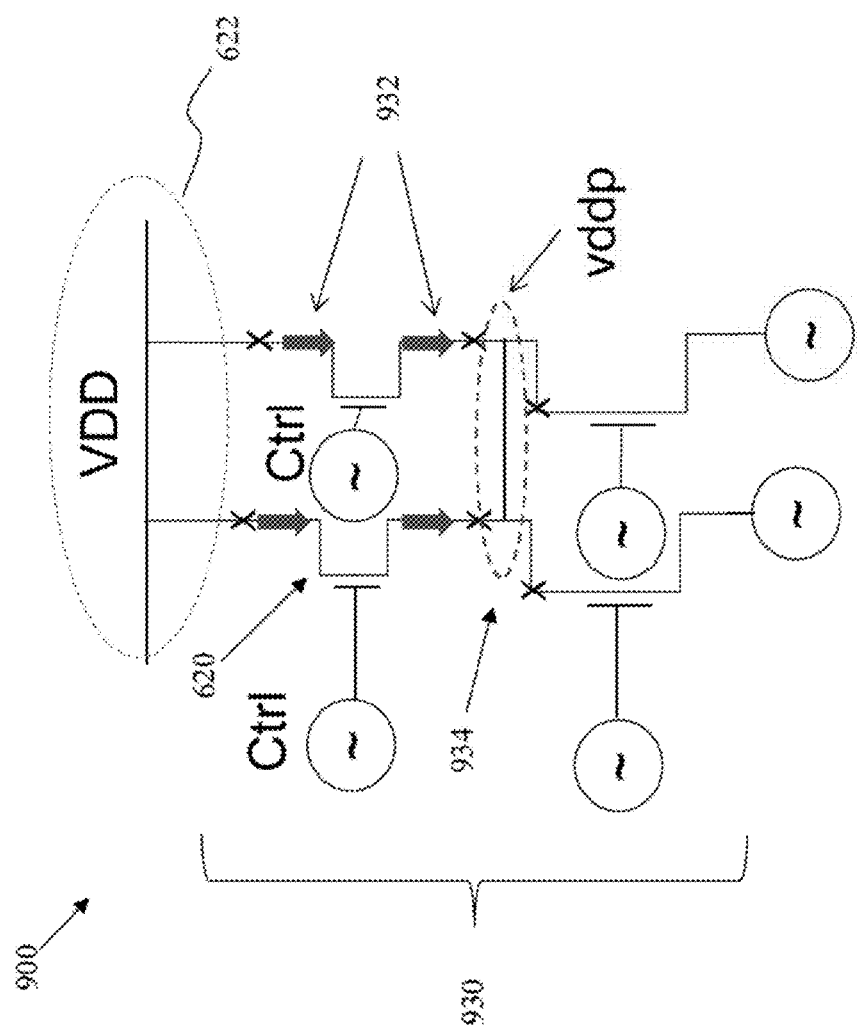
FIG. 9 illustrates an application of some embodiments of the invention.

FIG. 9 illustrates an application of this embodiment of the invention. As before, the circuitry 900 includes a global power net 622 that is connected to power gates 620. In this circuit, the MOSFET transistors 620 connect the global power net 622 to the virtual power net.

For the analysis, two levels 930 of the circuit 900 are carved out for the analysis. Here, the power gate MOSFETs 620 are kept as nonlinear tap devices, with one tap node (x) on the global net 622 and another on the virtual net 934. The tap nodes 932 have concurrently computed device current, conductance, and capacitance. This approach allows for all operation modes based upon the control signal.

Any suitable approach can be taken to perform the desired analysis. In some embodiments, bordered block diagonal (BBD) analysis is performed. This approach breaks up the portions of the circuit to be analyzed into different blocks, and applies BBD techniques to more efficiently perform the computations. Alternatively, a brute force approach can be taken to solve the matrices to perform the computations.

Therefore, what has been described is an improved approach for performing analysis of an electronic design, such as designs having power gates that utilize analysis of multiple levels of the net.

The inventive two-stage approach is applied to analysis nets having power gates, where a larger portion of the circuitry is carved out for analysis (e.g., two levels instead of one level). This approach provides analysis results that are much more accurate as compared to the alternative approach of approximating resistance values. In addition, the simulations are performed using voltages that take RC effects into account on the power net, which provides a great improvement over approaches that merely assume constant VDD voltage values and/or approximated resistance values for the power get transistors. This level of design detail being considered during analysis allows for very realistic and accurate analysis results.

Moreover, the present approach also provides a very efficient and cost-effective way to perform the analysis, since the first stage aspect of first computing the voltage values can be performed very efficiently, particularly as compared to the approach of first computing current values. This approach can be used for any type of analysis of any portion of the circuit design. While the above embodiment was described with respect to analysis of a power net having a power gate, it is noted that other types of circuit design analysis may also be performed using the above-described approach. In addition, while the approach is particularly useful to perform EM and IR drop analysis, it is also applicable to other types of electrical analysis as well.

System Architecture Overview

Figure 10:
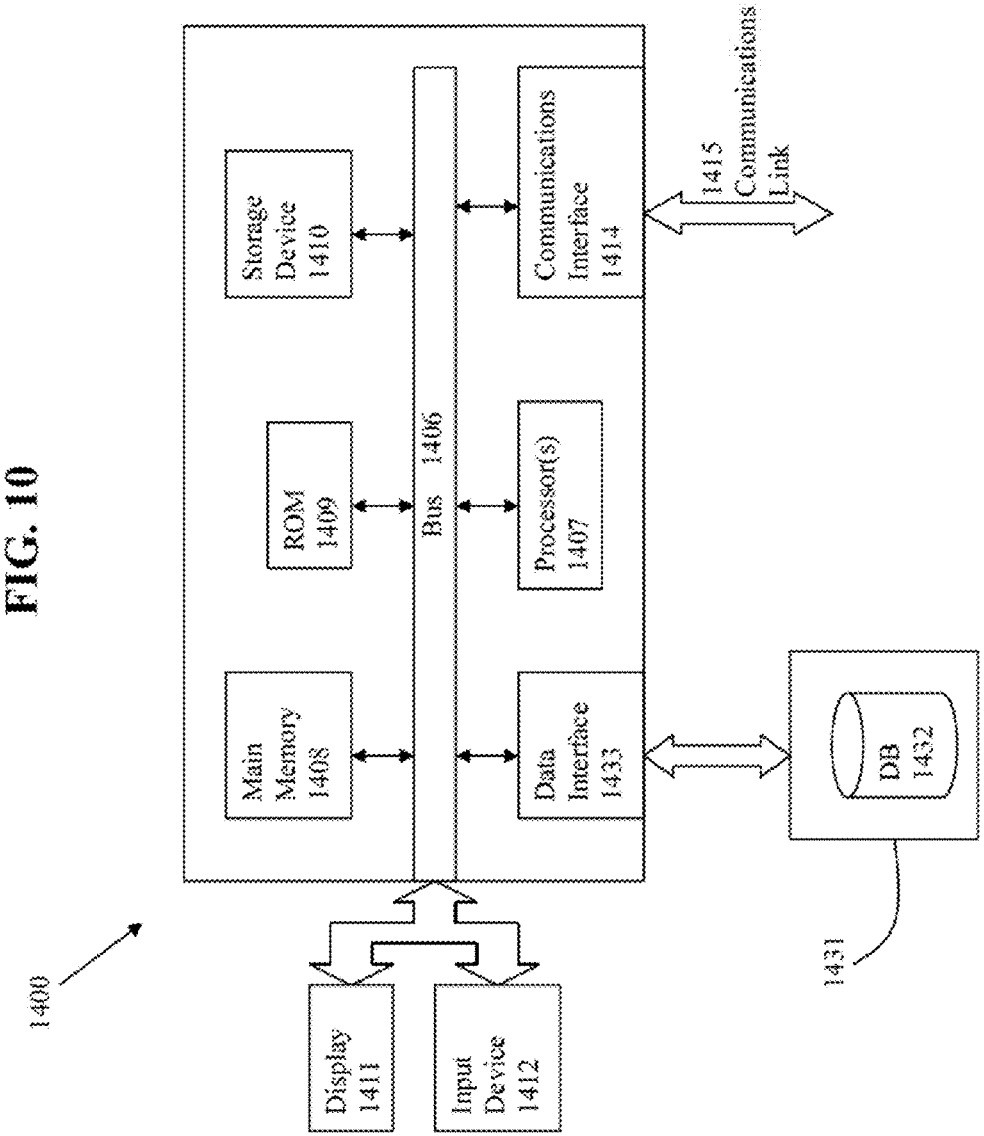
FIG. 10 depicts a computerized system on which some embodiments of the invention can be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor for analyzing a circuit design, comprising:

one or more computing systems receiving an electronic design for analysis from a non-transitory storage medium or a network path;

the one or more computing systems executing a first sequence of instructions of a program code stored on the non-transitory computer readable medium using one or more processors to calculate voltage values for tap nodes for a net in the electronic design in a first stage analysis, rather than using a constant power supply voltage for the net of the electronic design; and the one or more computing systems executing a first sequence of instructions of the program code using the one or more processors for performing a simulation on a new netlist that includes the tap nodes and one or more tap devices at a first level in a second stage, wherein the new netlist comprises at least the first level and a second level that forms a first net in the net, the tap nodes or the one or more tap devices are identified to be included in the new netlist based at least on their close proximity to the net, and the voltage values calculated in the first stage are used to perform the simulation in the second stage.

2. The method of claim 1, in which the net comprises a power gate, and the first net comprises a virtual net having one or more non-tap nodes.

3. The method of claim 2, in which the power gate is automatically identified by identifying a transistor having a source connected to a global supply net and a drain connected to a virtual power net.

4. The method claim 1, in which bordered block diagonal computations are used to perform the simulation.

5. The method of claim 1, in which the first stage is performed by simulating the circuit design with a simplified model of physical behaviors of resistive, capacitive and/or inductive effects in selected nets of the circuit design.

6. The method of claim 1, in which the second stage comprises concurrently calculating a tap current for the tap nodes.

7. The method of claim 6, in which the tap current is concurrently calculated by using the voltage values for the tap nodes from the first stage.

8. The method of claim 6, in which simulation is performed in the second stage using the tap currents along with a detailed parasitic resistor, capacitor, or inductor network model.

9. The method of claim 1, in which the voltage values comprise tap node voltages and interface node voltage source voltages.

10. The method of claim 1, in which the net being analyzed comprises any portion in the circuit design.

11. The method of claim 1, in which a simplified model is used for the net being analyzed.

12. The method of claim 1, in which a simulator transient analysis is performed to obtain voltage waveforms for the tap nodes.

13. The method of claim 1, further comprising performing an electromigration (EM) analysis or an IR drop analysis.

14. A computer program product embodied on a non-transitory computer usable medium, the non-transitory computer readable medium having stored thereon a sequence of instructions which, when executed by a processor causes the processor to execute a method for analyzing a circuit design, the computer program product comprising:

a first segment of program code, a compiled version of which, when executed by one or more processors of one or more computing systems, cause the one or more computing systems to receive an electronic design for analysis;

a second segment of program code, a compiled version of which, when executed by the one or more processors of the one or more computing systems, cause the one or more computing systems to calculate voltage values for tap nodes for a net in the electronic design in a first stage analysis, rather than using a constant power supply voltage for the net of the electronic design to obtain the voltage values for the tap nodes; and a third segment of program code, a compiled version of which, when executed by the one or more processors of the one or more computing systems, cause the one or more computing systems to perform a simulation on a new netlist including the tap nodes or one or more tap devices at a first level in a second stage, wherein the new netlist comprises at least the first level and a second level that forms a first net in the net, the tap nodes or the one or more tap devices are identified to be included in the new netlist based at least on their close proximity to the net, and the voltage values calculated in the first stage are used to perform the simulation in the second stage.

15. The computer program product of claim 14, in which the first net comprises a power gate device.

16. The computer program product of claim 14, in which bordered block diagonal computations are used to perform the simulation.

17. The computer program product of claim 14, in which the first stage is performed by simulating the circuit design with a simplified model of physical behaviors of resistive, capacitive and/or inductive effects in selected nets of the circuit design, and the second stage comprises concurrently calculating a tap current for the tap nodes.

18. A system for analyzing a circuit design, comprising:

a processor of a computing system;

a memory storing thereupon programmable code, which when executed by the processor, causes the processor to at least:

receive an electronic design for analysis via a computer bus from a non-transitory computer readable medium or the memory or from a network path;

calculate voltage values for tap nodes or one or more tap devices for a net in the electronic design in a first stage analysis, rather than using a constant power supply voltage for the net of the electronic design, and store the voltage values in the memory or in a non-transitory computer readable medium, wherein the tap nodes or the one or more tap devices are identified based at least on their close proximity to the net; and perform a simulation on a new netlist comprising at least the tap nodes or the one or more tap devices at a first level in a second stage, wherein the new netlist comprises at least the first level and a second level that forms a first net in the net; and identify the tap nodes or the tap devices by determining whether the tap nodes or the tap devices are within close proximity of the net.

19. The system of claim 18, in which the net comprises a power gate device.

20. The system of claim 18, in which an electromigration (EM) analysis or an IR drop analysis is performed on both the first level and the second level of the electronic design.

* * * * *